United States Patent Office 3,594,111
Patented July 20, 1971

3,594,111
METHOD OF DYEING THE SURFACE OF PLASTIC ARTICLES
Harold A. Wittcoff and William S. Baldwin, Minneapolis, Minn., assignors to General Mills, Inc.
No Drawing. Filed Mar. 25, 1968, Ser. No. 715,522
Int. Cl. D06p 1/00
U.S. Cl. 8—4          8 Claims

ABSTRACT OF THE DISCLOSURE

The surface or a portion thereof of a plastic article is altered with an organophilic clay obtained by replacing inorganic cations of montmorillonite clays with substituted ammonia cations. The resulting treated plastic is then dyed with a solvent dye.

---

The present invention relates to an improved method of dyeing the surfaces of plastics. More particularly, it relates to such a method wherein the surface or a portion thereof of a plastic article is altered with an organophilic montmorillonite clay and then the so altered surface is contacted with a solvent dye.

Polyethylene and various other plastics are extremely difficult to dye by conventional methods. In this regard, oil soluble or solvent dyes which are added to the surfaces of sheets of these untreated synthetic resinous materials tend to smear and are often readily removed by merely using light to moderate rubbing pressure.

We have now discovered that the surfaces of plastic materials can be readily dyed with solvent dyes if they are first altered with an organophilic montmorillonite clay wherein the inorganic cation of the naturally occurring clay is replaced by a substituted ammonium cation. Our process allows the dyeing of the entire surface or surfaces of the plastic materials or portions thereof such as when numbers, letters, etc. are printed thereon.

The organophilic montmorillonite clays are prepared in the conventional manner by adding an amine, an amine salt or a quaternary ammonium compound to an aqueous dispersion of a montmorillonite clay. The montmorillonite clays include the sodium, potassium, lithium and other bentonites and of these the sodium bentonites are the preferred montmorillonite clays used to prepare the organophilic clays.

A wide variety of substituted ammonium compounds are useful in preparing the organophilic clays. Preferred such compounds are amines and quaternary ammonium compounds having at least one long chain aliphatic radical containing at least about eight carbon atoms. Where an amine is used, it is preferably added to the aqueous clay dispersion as a salt of a water soluble acid such as acetic, hydrochloric and the like. The preferred quaternaries are the chlorides. Illustrative of these various amines and quaternaries are the following: octyl amine, dioctyl amine, decyl amine, methyl decyl amine, didecyl amine, tridecyl amine, dodecyl amine, dodecenyl amine, didodecyl amine, hexadecyl amine, hexadecenyl amine, octadecyl amine, dioctadecyl amine, methyldioctadecyl amine, octadecenyl amine, dimethyldioctylammonium chloride, methyltrioctylammonium chloride, trimethyldecylammonium bromide, dimethyldidecylammonium chloride, dimethyldidecylammonium sulfate, dimethyldecylbenzylammonium chloride, dimethyldidodecylammonium chloride, trimethyl dodecylammonium chloride, dimethyldiundecylammonium chloride, dimethylhexadecylbenzylammonium chloride, dimethyldihexadecylammonium chloride, dimethyldioctadecylammonium chloride, dimethyldioctadecenylammonium chloride and the like.

The montmorillonite clays have base-exchange capacities of 60–30 milliequivalents of exchangeable base per 100 grams of clay. A sufficient amount of the substituted ammonium compound is reacted with the clay to render the same organophilic. Preferably, the amine or quaternary ammonium compound is reacted in an amount sufficient to satisfy the base exchange capacity of the clay—i.e. substantially all of the replaceable inorganic cations of the clay are replaced with substituted ammonium cations.

As indicated above, the amine, amine salt or quaternary ammonium compound are added to an aqueous dispersion of the clay. Such addition is preferably accompanied by agitation of the reaction mixture. The reaction also proceeds at room temperature although higher and lower temperatures can be used. The organophilic clay is produced almost immediately as a flocculent precipitate which is readily separated and can be subsequently washed, filtered dried and pulverized. A variety of these organophilic clays are available commercially. Their preparation is also described in numerous patents including Ratcliff Pat. 2,622,987, which disclosure is incorporated herein by reference.

The surface of the plastic can be altered with the said organophilic clay by various means. In this regard it is only necessary that a reasonably uniform embedding of the organophilic clay molecules on the surface, or that portion of the surface to be dyed, of the plastic is achieved. One preferred procedure is to mill the plastic with the organophilic clay and then mold or otherwise form the plastic-organophilic clay particles into desired shapes. Another preferred procedure which requires less of the organophilic clay is to distribute the same in finely powdered form on the surface of the plastic and then seal the clay to the surface with heat and pressure. The finely powdered organophilic clay can be held temporarily on the surface electrostatically. Likewise, a dispersion of the clay in an organic solvent such as mineral spirits can be used to coat the surface of the plastic and, after evaporation of the solvent, the clay can also be embedded with the aid of heat and pressure. The organophilic clay is used in amount sufficient to improve the dyeability of the plastic surface.

After the surface has been altered by embedding the organophilic clay therein, the treated plastic is contacted with a solvent dye. A wide variety of solvent dyes can be used. Representative thereof are the following: Solvent Yellow 1, (CI 11000) Solvent Yellow 3, (CI 11160) Solvent Orange 3, (CI 11270B) Solvent Orange 7, (CI 12140) Solvent Red 1, (CI 12150) Solvent Red 24, (CI 26105) Solvent Violet 8, (CI 42535B) Solvent Blue 4, (CI 44045B) Solvent Blue 7, (CI 50400) Solvent Blue 36, Solvent Green 3, (CI 61565) Solvent Black 5, (CI 50415) and the like. These and other useful solvent dyes are identified in the Technical Manual of the American Association of Chemists and Colorists, vol. 42, 1966, pp. D–124–6, which disclosure is incorporated herein by reference. The said dyes are normally and preferably applied as dilute solutions (i.e. 0.1 to 5% by weight) in organic solvents. The organic solvents are those that are reasonably volatile under ambient conditions. Illustrative solvents are mineral spirits, benzene, xylene, toluene, ethyl acetate, acetone, ethyl and high alcohols, and the like.

The dye can be applied to the entire surface or to only a portion of the surface such as when the same is printed. In this latter regard, our invention facilitates the marking of prices and the like on various packaged goods such as food products sold in clear plastic wrapped units.

The following example serves to illustrate the invention without being limiting.

EXAMPLE I

Fifty gram portions of particulate low density polyethylene were milled with 1, 2 and 5% by weight of organophilic clay in a lab sized Brabender mixer at 200° C. The said clay was prepared by the reaction of an aqueous dispersion of sodium bentonite and dioctadecyldimethylquaternary ammonium chloride, the quaternary being used in an amount sufficient to satisfy the exchange capacity of the clay. The flocculent clay was separated by filtration and dried prior to being milled with the polyethylene. The milled samples were then formed into a number of sheets by hot pressing in a heated hydraulic press. The resulting sheets, along with sheets prepared from the polyethylene alone and the polyethylene containing 2% by weight unmodified sodium bentonite, were dipped into 0.2% solutions of Solvent Red 24 dye (Walker's), Solvent Yellow 3 dye (Walker's) and Solvent Blue 36 (Walker's) in mineral spirits for two minutes. The sheets were then washed with a stream of mineral spirits to remove excess dye solution. The control polyethylene sheets and the ones prepared using unmodified clay showed zero dye retention. The treated samples were fairly uniformly dyed by the yellow, red and blue dyes, respectively, with the intensity of color being the highest in the sample containing the 5% by weight level of organophilic clay.

EXAMPLE II

An untreated polyethylene film was coated with a 3% by weight gel of the organophilic clay as used in Example I in mineral spirits using a .005 inch doctor blade. The mineral spirits solvent was removed by evaporation in a forced draft oven. The organophilic clay was sealed into the surface of the polyethylene by a hot iron. The resulting treated film and an untreated control were dipped into a 1.0% by weight solution of solvent blue dye as used in Example I in mineral spirits and then rinsed with mineral spirits to remove excess dye. Dye retention on the polyethylene treated with the organophilic clay was appreciable while no color could be observed on the control.

While the above examples illustrate the invention with regard to polyethylene, it is readily apparent that the same is useful in dyeing any synthetic plastic. Illustrative of other such plastics which can be dyed by our process are nylon, Dacron, Orlon, various resinous polyesters, and the like. These materials can be in various physical shapes such as thin films, molded articles, fabrics and the like.

It is to be understood that the invention is not to be limited to the exact details of operation or the exact processes shown and described, as obvious modifications and equivalents will be apparent to those skilled in the art and the invention is to be limited only by the scope of the appended claims.

The embodiments of this invention in which an exclusive property or privilege is claimed are defined as follows:

1. The process of dyeing at least a portion of a surface of a plastic article which comprises altering the surface by embedding therein an organophilic clay obtained by replacing inorganic cations of a montmorillonite clay with substituted ammonium cations and then applying a solvent dye to the treated surface, said organophilic clay being used in an amount sufficient to improve the dyeability of the surface of the plastic article.

2. The process of claim 1 wherein plastic is polyethylene.

3. The process of claim 1 wherein the surface is altered by milling the plastic with the organophilic clay prior to forming an article therefrom.

4. The process of claim 1 wherein the surface is altered by at least partially coating the same with the organophilic clay, followed by applying heat and pressure to the coated surface.

5. The process of claim 1 wherein the solvent dye is used as a solution in an organic solvent.

6. The process of claim 1 wherein the clay is present in an amount of from 1% to 5%.

7. The process of claim 1 wherein substantially all of the replaceable inorganic cations of the montmorillonite clay are replaced with the substituted ammonium cations.

8. The process of claim 7 wherein the substituted ammonium cations are derived from a quaternary ammonium compound.

References Cited

UNITED STATES PATENTS 2,622,987  12/1952  Ratcliffe _____ 106—20

OTHER REFERENCES

E. A. Hauser et al., Jour. American Chem. Society, July 1940, 8—8 Lit., pp. 1811–1814.

Exparte Schoeneberg et al., Decision of the Board of Appeals, Pat. No. 3,190,718, Paper No. 27, 4 pages.

Exparte Schoonover et al., Decision of the Board of Appeals, Pat. No. 2,743,991, Paper No. 23, 6 pages.

GEORGE F. LESMES, Primary Examiner

T. J. HERBERT, Jr., Assistant Examiner

U.S. Cl. X.R.

8—31, 84; 260—41